Figure 1:
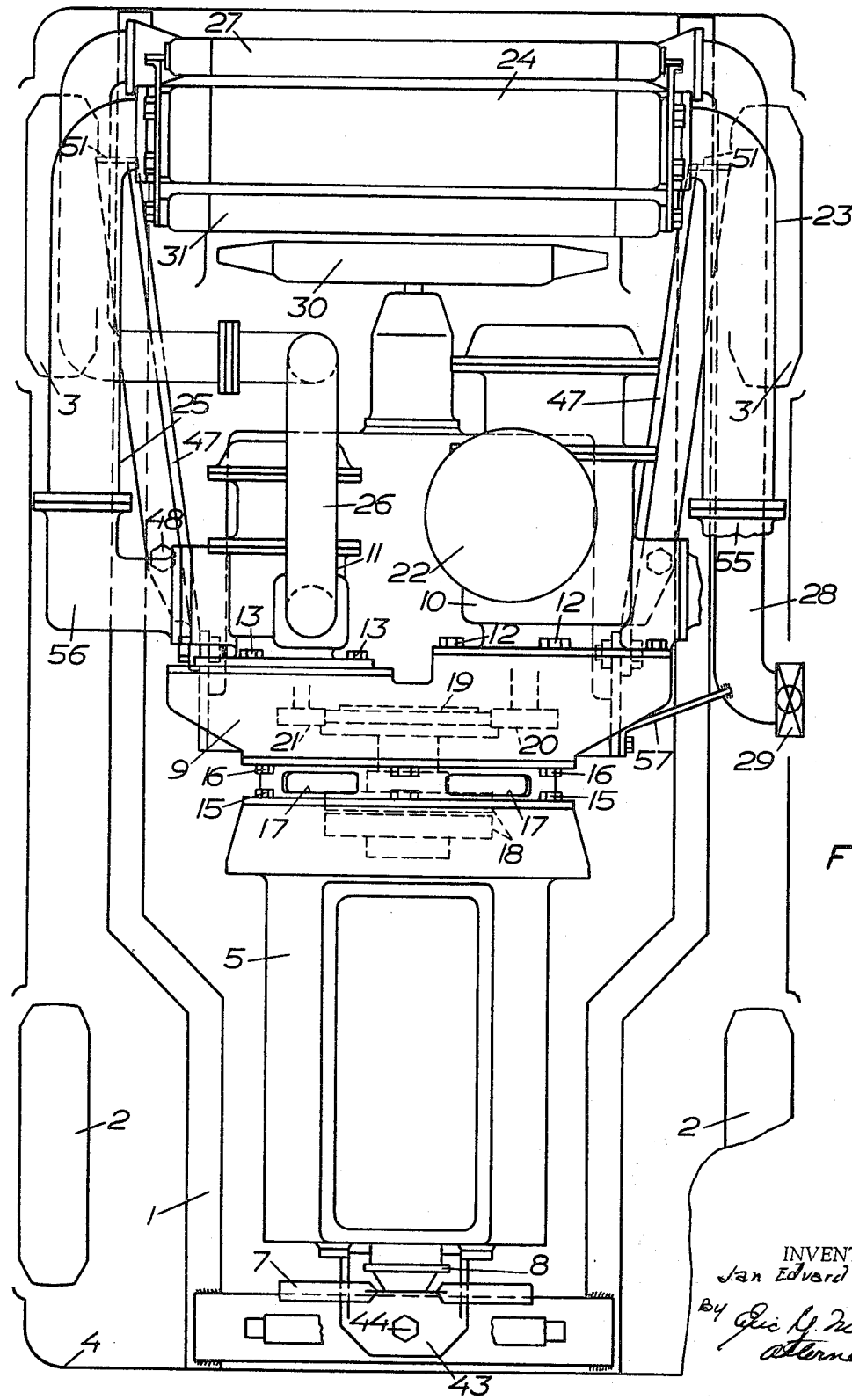

June 11, 1968   J. E. PERSSON   3,387,770
MOTOR COMPRESSOR UNITS
Filed June 23, 1966   5 Sheets-Sheet 1

INVENTOR.
Jan Edvard Persson

INVENTOR.
Jan Edvard Persson
BY
ATTORNEY

June 11, 1968     J. E. PERSSON     3,387,770
MOTOR COMPRESSOR UNITS
Filed June 23, 1966     5 Sheets-Sheet 4
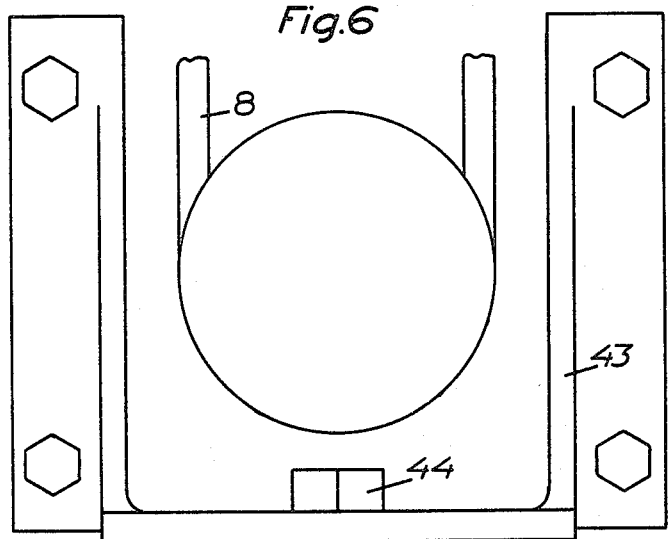
Fig.6
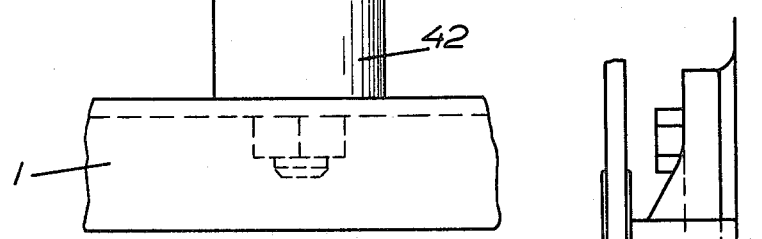
Fig.5
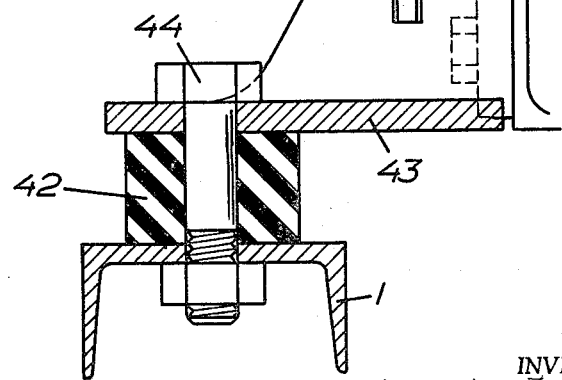
INVENTOR.
Jan Edvard Persson
BY

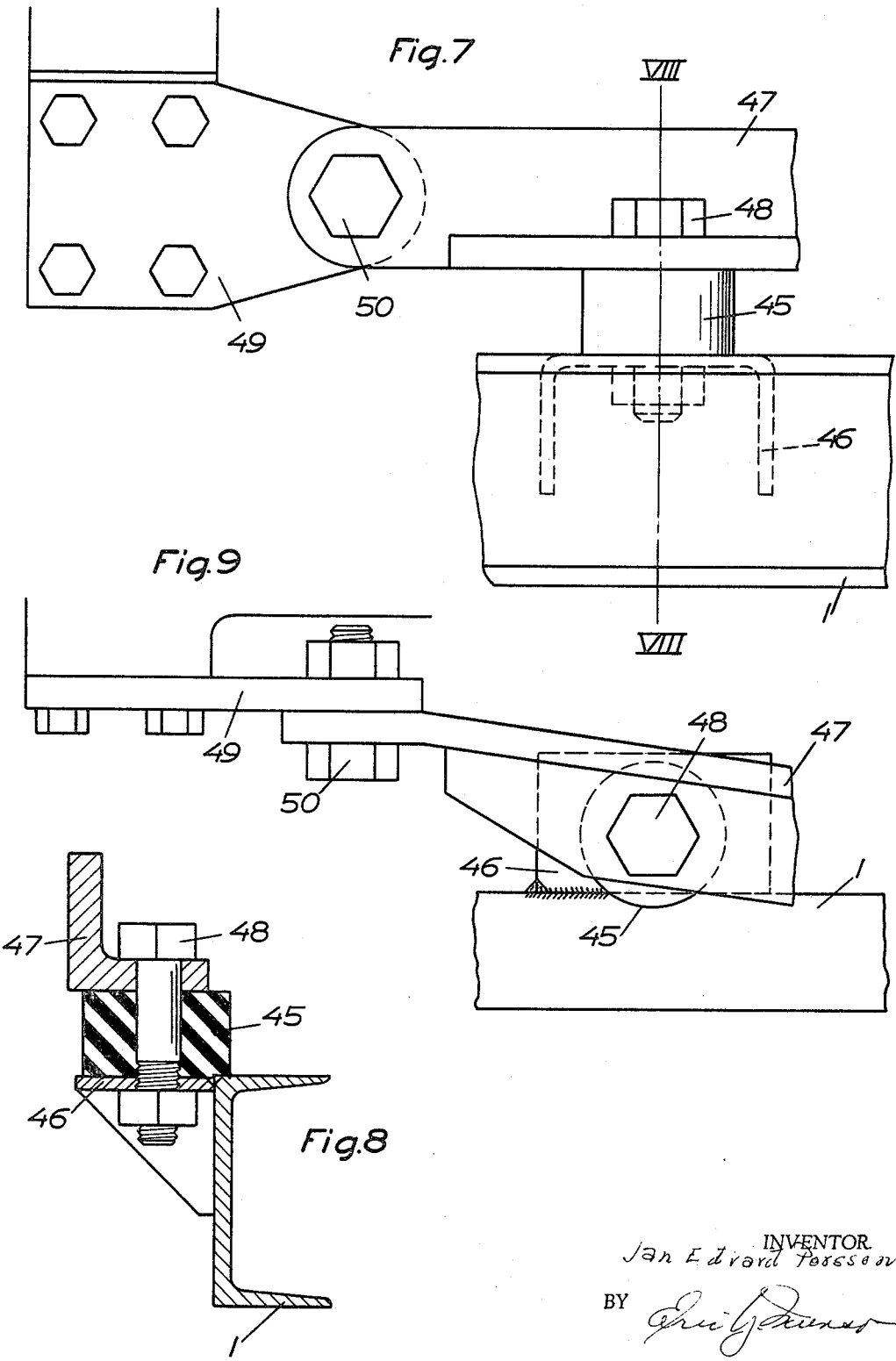

United States Patent Office 3,387,770
Patented June 11, 1968

3,387,770
MOTOR COMPRESSOR UNITS
Jan Edvard Persson, Ektorp, Sweden, assignor to Atlas Copco Aktiebolag, Nacka, Sweden, a corporation of Sweden
Filed June 23, 1966, Ser. No. 564,476
8 Claims. (Cl. 230—139)

This invention relates to motor compressor units suspended by a frame for transportation purposes. In a preferable embodiment of the invention a motor compressor unit may consist of a motor such as an internal combustion engine or an electric motor to which motor a gear casing and two or more compressors carried by said gear casing are rigidly flanged. Furthermore, a cooling apparatus which may consist of an intermediate cooler and/or an aftercooler is connected to the compressors rigidly by means of substantially non-resilient conduits, such as heavy pipes. One object of the invention is to provide a suspension arrangement which supports the motor compressor unit and coolers on a frame without transmitting dangerous stresses to the motor compressor unit originating from unavoidable deformations of the frame during transportation, and also to allow sufficient movability between the coolers and the compressors to take care of extension or contraction of parts due to variations in temperature of the compressed fluid passing through the conduits connecting the coolers with the compressors. For the above and other purposes I provide a motor compressor unit comprising in combination a motor having a casing, at least first and second compressors having casings, a power transmission casing between said motor casing and said compressor casings, means for flanging and rigidly securing said power transmission casing to said motor casing, means for flanging and rigidly securing said compressor casings to the transmission casing, a fluid cooling apparatus, fluid conduits extending between said casings and said cooling apparatus, a main frame, a first resilient supporting means on said frame for supporting a portion of the motor casing remote from the transmission casing on said first supporting means, a pair of second resilient supporting means on the main frame, and a pair of elongated members flexibly supported between their ends one on each of said pair of second supporting means, one end of said elongated members being pivotally connected to the transmission casing and the other end being flexibly connected to said cooling apparatus to support the cooling apparatus.

In the accompanying drawings one embodiment of a portable motor compressor unit according to the invention is illustrated by way of example. However, it should be understood that the invention may be employed in connection with other portable compressors of the single or multiple compression stage type and with air or liquid cooling.

Figure 2:
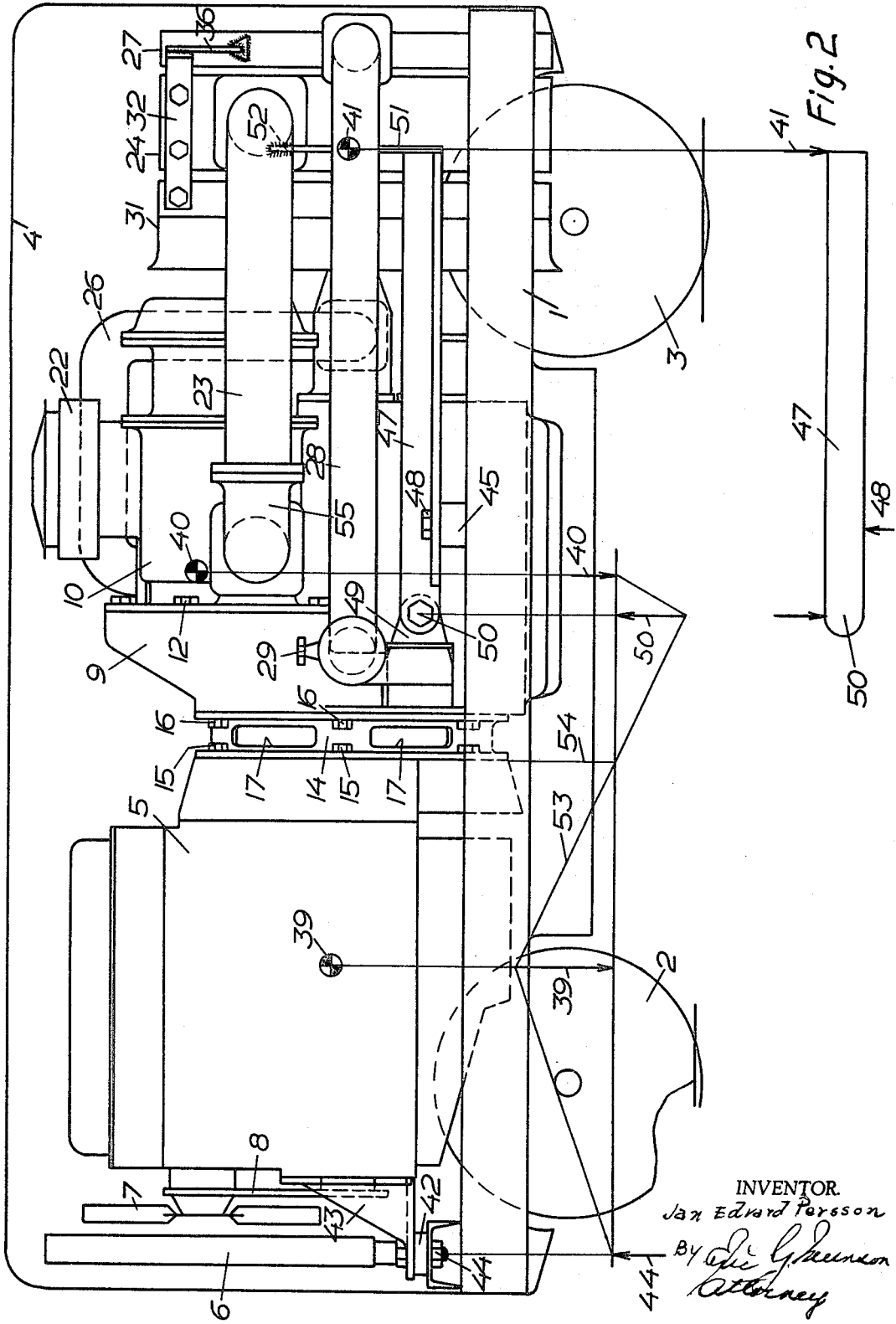
Figure 3:
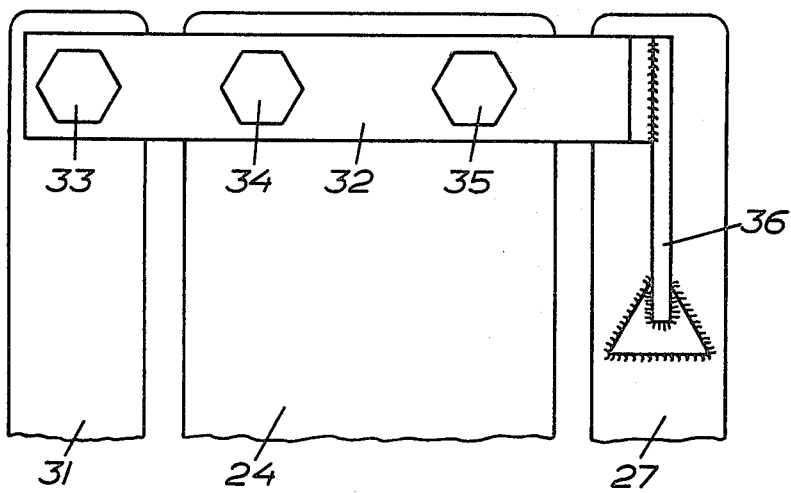
Figure 4:
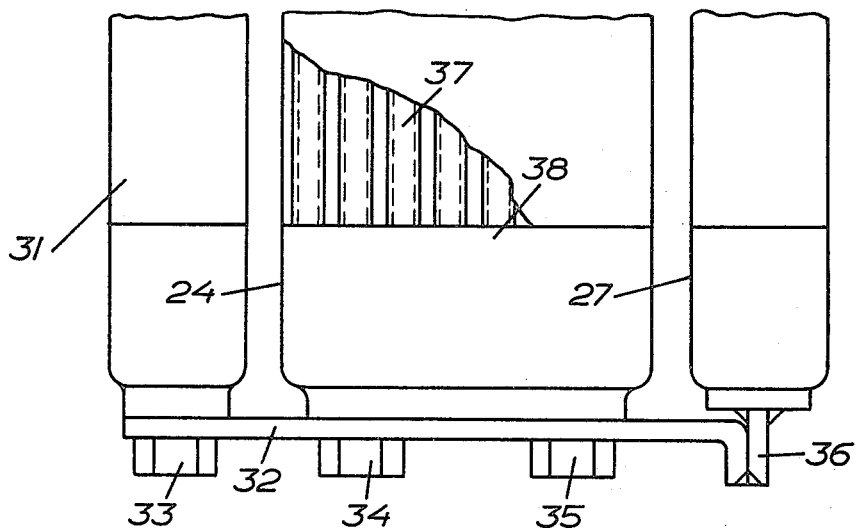

In the drawings FIG. 1 is a plan view and FIG. 2 a side view of a motor compressor unit according to the invention. In FIG. 2, furthermore, a diagram showing the distribution of bending moments and weight within the motor compressor unit according to FIGS. 1 and 2 is illustrated. FIG. 3 is a side view on a larger scale of the top portion of the cooling apparatus and FIG. 4 is a plan view of a portion of the cooling apparatus in FIG. 3. FIG. 5 is a view partly in section on a larger scale of the front end suspension of the motor in the unit and FIG. 6 is a front view of the motor suspension according to FIG. 5. FIG. 7 is a side view on a larger scale of a portion of one of the elongated members supporting the compressors, the transmission, and the cooling apparatus and FIG. 8 is a section on line VIII—VIII in FIG. 7. FIG. 9 is a plan view of the parts illustrated in FIG. 7.

The motor compressor unit illustrated in the drawings is carried by a main frame 1 supported by four wheels 2, 2 and 3, 3 and enclosed by a canopy 4 in conventional manner. The illustrated motor compressor unit consists of an internal combustion engine having a casing 5 and provided with a cooler 6 and a cooling fan 7 driven from the engine by a fan belt 8. A compressor unit comprising a power transmission casing 9 having a low pressure compressor 10 and a high pressure compressor 11 is flanged and rigidly secured to said transmission casing by means of bolts 12, 13. The compressors 10 and 11 may be screw compressors or other types of compressors. The transmission casing 9 is flanged and bolted to the motor casing 5 through an intermediate coupling casing 14 by means of bolts 15, 16. The coupling casing 14 is provided with openings 17 through which the bolts of a coupling 18 are accessible when it is desired to separate the engine from the compressor transmission casing 9. The engine drives the compressors through the coupling 18 and a toothed gear 19 which drives gears 20 and 21 connected to the low pressure and high pressure rotors (not illustrated). Air is supplied to the low pressure compressor 10 through a filter 22 which may also form an inlet silencer. From the low pressure compressor a substantially rigid conduit 23 leads to an intercooler 24 and from said intercooler a substantially rigid conduit 25 leads to the inlet conduit of the high pressure compressor 11. From the high pressure compressor 11 a conduit 26 leads to an aftercooler 27 from which a conduit 28 leads to the compressor unit delivery valve 29. 30 is a cooling air fan and 31 is an oil cooler which is connected to the transmission casing 9 and the compressors by flexible tubes (not illustrated in the drawings). As obvious from FIGS. 3 and 4 the coolers 24, 27 and 31 are connected by means of horizontal flat iron members 32 which are bolted to the various coolers by means of bolts 33, 34, 35 and welded to the cooler 27 by means of a flexible spring member such as a flat spring 36 which permits a certain motion of the cooler 27 relative to the cooler 24. The cooler 24 consists of a number of relatively thin tubes 37 which are connected at their ends to headers 38 so that the whole cooling element is slightly elastic. The coolers 31 and 27 may be designed in similar way.

In FIG. 2 the center of gravity of the internal combustion engine, the transmission casing and compressors and the cooling apparatus are indicated at 39, 40 and 41. The internal combustion engine 5 is supported at the fan end by a resilient rubber support 42 on which the engine rests with a supporting bracket 43. The bracket 43 is bolted to a cross member of the frame 1 by means of a bolt 44.

The other end of the internal combustion engine 5 is bolted to the transmission casing 9 through the intermediate or coupling casing 14 and is carried together with the transmission casing and the cooling apparatus by two elongated members 47, which are carried by resilient rubber members 45 supported on brackets 46 on the frame 1. The elongated members 47 are secured to the frame 1 by means of bolts 48. The elongated members 47 are journalled to brackets 49 by means of hinge bolts 50 at one end and at the other end the elongated members 47 are connected to the cooling apparatus by means of spring steel members 51 which are welded to the underside of the conduits 23 and 25 respectively as indicated at 52 in FIG. 2. The suspension of the cooling apparatus 24, 27, 31 on the resilient members 51 at the ends of the long arms of the elongated members 47 permits the tubes 23, 28, 26 and 25 to change their lengths due to variations in temperature of the fluid passing said tubes without transmitting undue stresses to the transmission casing 9 or the compressors 10, 11, and simultaneously the elongated members 47 carry the weight of the compressor unit and a portion of the weight of the internal combustion engine to the frame through the resilient members 45 so that deformations of the frame 1 during traction of the motor compressor unit does not influence the rigid motor compressor unit suspended by the frame 1.

The bending moment and weight distribution along the motor compressor unit is illustrated in the diagram in the low portion of FIG. 2. The diagram 53 is a moment diagram which shows that the moment is zero in the flange between the coupling casing 14 and the motor casing 5, i.e. in the transverse plane 54. In the illustrated embodiment it has been attempted to protect the motor compressor unit i.e. the rigid unit consisting of the motor 5, the transmission casing 9 and compressors 10, 11 and coolers 27, 24, 31 as well as the pipe conduits 23, 28, 25, 26 connecting the compressors to the coolers against stresses due to thermal expansion or contraction of the motor compressor unit parts. Other stresses may originate from acceleration or retardation of the various unit parts horizontally or vertically during transportation and the weight of the various casings which are flanged to each other.

The reduction of stresses has been achieved in the following manner. The complete motor compressor unit is suspended on three points 42, 45, 45 by the frame 1 of the unit. The points of attachment for the elongated members 47 on the transmission casing i.e. the points 50, 50 have been chosen so that the bending moment of the motor weight 39 and the moment of the compressor and cooler weights 40, 41 is zero in the plane 54 which is the attachment plane between the coupling casing 14 and the motor casing 5. The two points of suspension 45, 45 have been choosen so, that the load in the point 50 by the arm 50–48 equals the load in the point 41 by the arm 41–48. This results in small stresses produced by accelerations in vertical direction and particularly between the flanges between the pipes 23 and the outlet conduit 55 from the low pressure compressor as well as between the pipe 25 and the inlet conduit 56 of the high pressure compressor 11. In order to reduce the stresses in the connecting points between the elongated members 47 and the transmission casing and the cooling apparatus the connection to the transmission casing has been carried out as a hinge 50, 50 and the connection to the cooling apparatus as two resilient spring steel ribs or members 51, 51. Deflections of the elongated members 47 upon vertical accelerations will therefore affect the stiff motor compressor unit very little. Naturally the spring steel members 51, 51 may be replaced by other flexible members such as rubber cushions. The points of suspension 52, 52 for the cooling apparatus and the conduits 23, 25, 26, 28 has been choosen so, that the weight of the cooling apparatus and the weight of said conduits outweight each other in the points of suspension 52 and consequently the weights of the conduits and cooling apparatus does not produce a moment in the flange connections between the conduits 25, 56 and 23, 55. The flexibility of the supports 51, 51 avoids furthermore stresses due to different termal expansion of the conduits. There is nothing to prevent the cooling apparatus from moving axially of the motor compressos unit. Furthermore, the attachment of the aftercooler to the intermediate cooler through the two spring strips 36 takes care of any uneven thermal expansion between said two coolers and their connecting pipes.

It would be obvious from the foregoing description that most of the connections in the motor compressor unit above described do not transmit a moment and consequently the various units of the compressor unit or the various elements of the motor compressor unit may be separated without difficulty. When the motor is going to be separated from the compressor unit the compressor end of the motor of course has to be provisionally supported, for instance by a channel iron or other bar provided under the compressor end of the motor. The coupling 18 may be disconnected by removing the coupling bolts (not illustrated) which are accessible through the openings 17 in the coupling casing 14.

The motor compressor unit above described and illustrated in the drawings should only be considered as an example and may be modified in several different ways within the scope of the appended claims.

What I claim is:

1. A motor compressor unit comprising in combination a motor having a casing, at least first and second compressors having casings, a power transmission casing between said motor casing and said compressor casings, means for flanging and rigidly securing said power transmission casing to said motor casing, means for flanging and rigidly securing said compressor casings to the transmission casing, a fluid cooling apparatus, fluid conduits extending between said casings and said cooling apparatus, a main frame, a first resilient supporting means on said frame for supporting a portion of the motor casing remote from the transmission casing on said first supporting means, a pair of second resilient supporting means on the main frame, and a pair of elongated members flexibly supported between their ends one on each of said pair of second supporting means, one end of said elongated members being pivotally connected to the transmission casing and the other end being flexibly connected to said cooling apparatus to support the cooling apparatus.

2. A motor compressor unit according to claim 1, in which is provided a lower pressure compressor having a casing and a high pressure compressor having a casing, said casings being flanged and rigidly secured to the transmission casing, a substantially rigid conduit for partially compressed fluid leading from said low pressure compressor to the cooling apparatus, and a substantially rigid conduit for partially compressed fluid leading from the cooling apparatus to said high pressure compressor.

3. A motor compressor unit according to claim 1, in which the elongated members form cantilevers for supporting the transmission casing and the cooling apparatus, the pair of second supporting means being arranged to support said cantilevers adjacent the pivotal connections to the transmission casing and remote from the flexible connection to the cooling apparatus.

4. A motor compressor unit according to claim 1, in which the cooling apparatus comprises an inter stage cooler and an after cooler for fluid compressed in the compressor and connected with the compressors through substantially rigid conduits.

5. A motor compressor unit according to claim 1, in which the cooling apparatus comprises an oil cooler.

6. A motor compressor unit acording to claim 1, in which the motor casing, the transmission casing, the compressor casing and the cooling apparatus are arranged in tandem arrangement in the order mentioned hereinabove.

7. A motor compressor unit according to claim 2 in which the cooling apparatus comprises an oil cooler, an inter stage cooler, and an after cooler flexibly connected one to the other and one of them flexibly supported by the pair of elongated members.

8. A motor compressor unit according to claim 6, in which the cooling apparatus comprises an oil cooler, an interstage cooler, and an after cooler flexibly connected one to the other and one of them flexibly supported by the pair of elongated members.

References Cited

UNITED STATES PATENTS

| | | | |
|---|---|---|---|
| 1,895,816 | 1/1933 | Pfeiffer | 230—210 |
| 2,032,012 | 2/1936 | Grier | 230—210 |
| 2,804,260 | 8/1957 | Nilsoon et al. | 230—210 |
| 2,808,813 | 10/1957 | Lindhagen et al. | 123—12 |
| 2,963,884 | 12/1960 | Rosenschold et al. | 230—143 |
| 3,056,539 | 10/1962 | Pullin | 230—235 |
| 3,291,385 | 12/1966 | Williams et al. | 230—139 |

DONLEY J. STOCKING, *Primary Examiner.*

WILBUR J. GOODLIN, *Examiner.*